April 2, 1940.   O. WINDBERGER   2,195,688
MOTOR VEHICLE
Filed Oct. 31, 1936
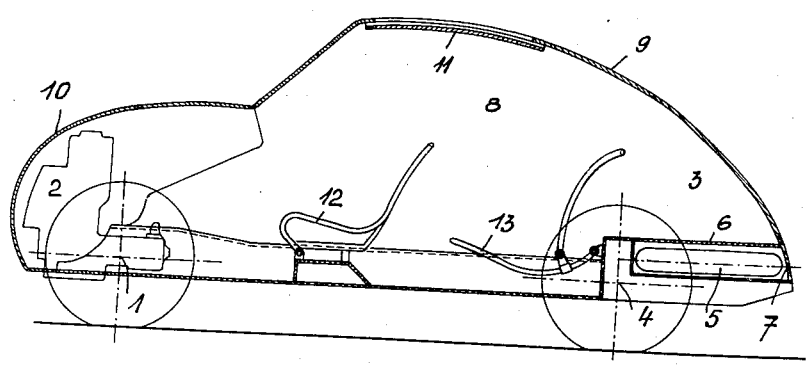
Othmar Windberger
INVENTOR
BY
ATTORNEY Patented Apr. 2, 1940

2,195,688

UNITED STATES PATENT OFFICE 2,195,688

MOTOR VEHICLE

Othmar Windberger, Steyr, Austria

Application October 31, 1936, Serial No. 108,533
In Austria November 6, 1935

1 Claim. (Cl. 296—37)

This invention relates to a motor vehicle for passengers, in which the body space is lengthened or enlarged as compared with the hitherto known motor vehicles having the same distance between the axles. The invention consists in this, that the engine is mounted in front of the front axle and the luggage space and the space for the spare wheel or the spare wheels is provided above or behind the rear axle, in such a way that the space between the axles can be entirely utilized for the seats or the rows of seats. The seats, the luggage space (trunk or the like) and the spare wheel space may be enclosed in stream-like body work, preferably with a stream-line engine bonnet forming a continuation thereof for the engine, which is disposed in front. Such an arrangement provides the advantage that, through the arrangement of the engine in front of the front axle, the vehicle space occupied by the body work can be considerably lengthened or enlarged, thus allowing for the requirement in the case of small vehicles, that the wheel base should be kept as small as possible, without interfering with the space to be occupied by the body work, while by placing the passenger space between the axles, that is in the quietest part of the vehicle, comfort in driving is greatly increased. The arrangement according to the invention provides the further advantage, that, owing to the arrangement of the seats between the axles made possible by the placing of the engine in front of the front axle, that is the rear seats in front of the rear axle, the rear axle does not interfere with the arrangement of the seating, so that the seats can be placed close to the floor, that is to say, as low as the height of the floor will permit.

A stream-line construction of the body work provides the further advantage, that the arrangement of the luggage space and the spare wheel space can be harmoniously embodied in this form, which is impossible with body work of another shape. The stream-line body work also provides advantages for the construction of the vehicle with a sliding roof, in so far as the sliding roof can be made capable of sliding or opening backwards into or towards the luggage space and spare wheel space behind the passenger space.

The arrangement according to the invention is made such that the space for the spare wheel and for the travelling trunk are disposed one above the other, the space for the spare wheel being arranged below the space for the travelling trunk but behind the rear axle and being accessible from the outside or from the back.

In the accompanying drawing a constructional example of the invention is shown.

In front of the front axle 1 is disposed the engine 2, whilst the luggage space 3 and the space 5 for the spare wheel are disposed substantially behind the rear axle 4. The space 5 for the spare wheel or spare wheels is disposed below the luggage space and separated from the latter by the wall 6, and is accessible from the outside, this space being closed by a part 7 of the stream-line casing, which can be removed or lifted off. The space between the axles 1 and 4 serves as the passenger space 8 with two rows of seats (front seats 12 and rear seats 13). Owing to the arrangement of the seats between the axles, that is of the rear seats in front of the axle, the rear axle in no way interferes with the seating arrangement, so that the seats can be placed as low as the height of the floor will permit. The passenger space 8 and the luggage and spare wheel space 3, 5, are jointly enclosed in stream-line body work 9, whilst the engine 2 is covered by the engine bonnet 10 in stream-line fashion.

According to the constructional example shown in the drawing, the stream-line body work is provided with a sliding roof 11, the body work having in the regions of the sliding roof the form of a body of convolution, that is to say, is of uniform longitudinal curvature in the region swept over by the sliding roof and is formed in all the cross-sectional places of this region with at least approximately the same cross profile, so that the sliding roof can be pushed towards the luggage space.

What I claim is:

A passenger motor car comprising a stream-lined shell enclosing the passenger and rear luggage compartments, a stream-lined hood portion enclosing the engine, a floor portion extending between the front and rear wheel axles, a vertical wall at the rear end of the floor, another floor extending from the upper edge of said wall to the rear end of the shell, a compartment underneath said second floor having an opening at its rear and a closure member for said opening, said closure member being stream-lined to conform to the shape of the shell.

OTHMAR WINDBERGER.